United States Patent
Jonsson et al.

(10) Patent No.: US 7,162,262 B2
(45) Date of Patent: Jan. 9, 2007

(54) METHODS, SYSTEMS AND COMPUTER PROGRAM PRODUCTS FOR REQUESTING RECEIVED POWER LEVELS BASED ON RECEIVED BLOCK ERROR RATES UTILIZING AN ANTI-WINDUP AND/OR EMERGENCY PROCEDURE

(75) Inventors: Elias Jonsson, Malmo (SE); Youssef Senhaji, Malmo (SE); Dimitrios Triantafillidis, Malmo (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 719 days.

(21) Appl. No.: 10/368,873

(22) Filed: Feb. 19, 2003

(65) Prior Publication Data

US 2004/0058699 A1 Mar. 25, 2004

Related U.S. Application Data

(60) Provisional application No. 60/412,897, filed on Sep. 23, 2002.

(51) Int. Cl.
*H04B 7/00* (2006.01)
*H04Q 7/20* (2006.01)

(52) U.S. Cl. ............ 455/522; 455/69; 455/127.1; 455/503; 455/517; 455/226.1

(58) Field of Classification Search ............ 455/522, 455/69, 503, 517, 226.1, 127.1
See application file for complete search history.

(56) References Cited

U.S. PATENT DOCUMENTS

| 6,292,519 | B1 | 9/2001 | Popovic ............... 375/346 |
|---|---|---|---|
| 6,341,225 | B1 | 1/2002 | Blanc .................. 455/522 |
| 6,859,656 | B1* | 2/2005 | Choi et al. ............ 455/522 |
| 2002/0028691 | A1 | 3/2002 | Moulsley et al. ...... 455/522 |
| 2003/0148769 | A1 | 8/2003 | Chi et al. ............. 455/453 |
| 2004/0203993 | A1* | 10/2004 | Tanoue ................ 455/522 |

FOREIGN PATENT DOCUMENTS

| EP | 0961417 A2 | 1/1999 |
|---|---|---|
| EP | 1067706 A1 | 1/2001 |
| EP | 1069704 A1 | 1/2001 |
| EP | 1089456 A2 | 4/2001 |
| EP | 1164714 A1 | 12/2001 |
| WO | WO/0045528 | 1/2000 |
| WO | WO 00/65748 | 11/2000 |
| WO | WO/01603 A1 | 1/2001 |
| WO | WO/29985 A1 | 4/2001 |

OTHER PUBLICATIONS

EPO Search Report dated Sep. 16, 2003.
International Search Report dated Feb. 2, 2004 for corresponding PCT application No. PCT/EP03/10462.

* cited by examiner

*Primary Examiner*—Matthew Anderson
*Assistant Examiner*—Sujatha Sharma

(57) ABSTRACT

A reference signal to interference ratio (SIR) value for use in requesting changes in a transmitted power level of a received signal of a communications channel is determined based on a current estimated block error rate of the communications channel, a reference block error rate and a measured SIR value of the received signal of the communications channel. Anti-windup procedures for updating the error signal, anti-windup procedures for updating a block error rate used in updating the reference SIR value and emergency procedures are also provided. Mobile terminals and base stations utilizing such procedures are also provided.

22 Claims, 4 Drawing Sheets

METHODS, SYSTEMS AND COMPUTER PROGRAM PRODUCTS FOR REQUESTING RECEIVED POWER LEVELS BASED ON RECEIVED BLOCK ERROR RATES UTILIZING AN ANTI-WINDUP AND/OR EMERGENCY PROCEDURE

CROSS-REFERENCE TO PROVISIONAL APPLICATION

This application claims the benefit of provisional Application No. 60/412,897, filed Sep. 23, 2002, entitled Anti-Windup And Emergency Procedures For Outer Loop Power Controllers Using Filtered Block Error Rates For WCDMA, the disclosure of which is hereby incorporated herein by reference in its entirety as if set forth fully herein.

FIELD OF THE INVENTION

This invention relates to communications systems, such as wireless communications systems, and operating methods therefor, and more particularly to the control of power levels for uplink and/or downlink communications.

BACKGROUND OF THE INVENTION

In conventional communications systems, such as Wideband Code Division Multiple Access (WCDMA) systems, the transmission power may be adjusted by the receiving system requesting an increase in transmission power from the transmitting system. Thus, for example, a mobile terminal may request that a base station increase its transmission power if the signal-to-interference ratio (SIR) of the received signal is below a predefined threshold. As used herein, the term "mobile terminal" encompasses a wide variety of portable wireless devices that can access a cellular system. Mobile terminals include, but are not restricted to, a cellular radiotelephone with or without a multi-line display, a Personal Communications System (PCS) terminal that may combine a cellular radiotelephone with data processing, facsimile and/or data communications capabilities, a Personal Digital Assistant (PDA) that can include a radiotelephone, pager, Internet/intranet access, Web browser, organizer, calendar and/or a Global Positioning System (GPS) receiver, and conventional laptop, palmtop and/or pervasive computing devices that include wireless receivers.

In many communication systems, such as a WCDMA system, transmitted data is organized such that a number of data bits are collected in a transport block. Several transport blocks are, typically, contained in a transmission time interval (TTI). Typically, in order to decode the transmitted data in the transport blocks the complete TTI must be received. Cyclic redundancy check (CRC) bits are, typically, added on each transport block. The CRC bits have special coding properties such that if the CRC bits are found to be wrong, the bits in the transport block are almost certainly decoded incorrectly. Similarly, if the CRC bits are found to be correct, the bits in the transport block are almost certainly decoded correctly. The block error rate (BLER) for a transport channel may, therefore, be estimated by filtering CRC error flags (CRCef) of the decoded transport blocks.

In a conventional power control system for WCDMA uplink or downlink, an inner loop and an outer loop of the power control system are provided. The outer loop sets a reference SIR value based on the deviation of a measured BLER from a reference BLER. The inner loop compares the measured SIR to the reference SIR. If the reference SIR is below the measured SIR a request is made to increase the received power, and vice versa. In a typical two loop power control system, the inner loop may be updated at about 1500 Hz and the outer loop updated between about 10 and about 100 Hz.

While requests for changes in power may be made, there is typically no guarantee that the requested changes are carried out. For example, in a congested system, the base station might not be able to grant the requested change in transmitted power. If the outer loop power control system bases the measured BLER on the history of the received CRC error flags, the measured BLER could reach very high levels if the requested power is denied for a prolonged period of time. This increase in measured BLER may result in an increase in the reference SIR value such that the reference SIR may increase without bounds.

One potential solution to such an unbounded increase in the reference SIR value is to bound the absolute value. However, in practice it may be difficult to find a narrow enough absolute range within which the reference SIR value is allowed to operate.

In addition to increases in the reference SIR value when requests for increased power are not granted, when the base station finally grants the requested increase in power the measured BLER may be very high. If a proportional integral derivative (PID) controller is utilized as the outer loop power controller, the reference SIR value could increase at a rate larger than the time to observe the change in the measured BLER as a result of increases in power from the base station. As a result, an unnecessary amount of power may be requested from the base station.

SUMMARY OF THE INVENTION

Embodiments of the present invention provide methods, systems and/or computer program products for determining a reference signal to interference ratio (SIR) value for use in requesting changes in a transmitted power level of a received signal of a communications channel by determining the reference SIR value based on a current estimated block error rate of the communications channel, a reference block error rate and a measured SIR value of the received signal of the communications channel. As used herein, the term "reference SIR value" refers to a single SIR value and/or a range of approved SIR values corresponding to a reference SIR value. Thus, for example, references to updating a reference SIR value or moving a reference SIR value may refer to updating or moving a single reference SIR value and/or a range of approved SIR values corresponding to a reference SIR value.

In further embodiments of the present invention, the reference SIR value is determined by comparing the measured SIR value to a predefined range of values associated with a current reference SIR value. The reference SIR value is selectively updated based on the current estimated block error rate, the reference block error rate and the comparison of the measured SIR value to the predefined range. For example, the reference SIR value may be selectively updated by updating of the reference SIR value if the measured SIR value is within the predefined range. The reference SIR value could also be selectively updated by updating the reference SIR value if the measured SIR value is outside the predefined range and the update of the reference SIR value moves the reference SIR value closer to the measured SIR value. The reference SIR value may be determined utilizing a proportional integral derivative (PID) determination.

In still further embodiments of the present invention, it is determined if the reference SIR value was not updated in an immediately prior determination of whether to update the reference SIR value. The current estimated block error rate is reset if it is determined that the reference SIR value was not updated in an immediately prior attempt to update the reference SIR value. The current estimated block error rate may be updated by bounding the current estimated block error rate with respect to at least one of a reference block error rate and/or a previous estimated block error rate. Furthermore, the current estimated block error rate may be stored if a previous determination of whether to update the reference SIR value determined not to update the reference SIR value. The current estimated block error rate may be stored by storing the current estimated block error rate if an immediately prior determination of whether to update the reference SIR value updated the reference SIR value and a current determination of whether to update the reference SIR value does not update the reference SIR value. Also, if an immediately prior determination of whether to update the reference SIR value did not update the reference SIR value and if a current determination of whether to update the reference SIR value updates the reference SIR value, the current estimated block error rate may be updated by setting the current estimated block error rate to a lowest one of a value based on a reference block error rate, a value based on the stored estimated block error rate and a value based on the current estimated block error rate.

In additional embodiments of the present invention, it is determined if a plurality of successive transmit time intervals (TTIs) have greater than a threshold value of transport blocks having error conditions. The reference SIR value is set to a value independent of the estimated block error rate if it is determined that a plurality of successive TTIs have greater than a threshold value of transport blocks having error conditions. The reference SIR value may be set by scaling the current SIR reference value with a constant value (typically>1) if it is determined that a plurality of successive TTIs have greater than a threshold value of transport blocks having error conditions. In particular embodiments, the reference SIR value is determined utilizing a proportional integral derivative (PID) determination if it is not determined that a plurality of successive TTIs have greater than a threshold value of transport blocks having error conditions and determined without utilizing the PID determination if it is determined that a plurality of successive TTIs have greater than a threshold value of transport blocks having error conditions.

As will be appreciated by those of skill in the art in light of the present disclosure, the present invention may be embodied as methods, systems, computer program products and/or control circuits. Furthermore, particular embodiments of the present invention may provide mobile terminals and/or base stations.

DETAILED DESCRIPTION OF EMBODIMENTS

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions.

The present invention is described below with reference to block diagrams and/or flowchart illustrations of methods and mobile terminals according to embodiments of the invention. It is understood that each block of the block diagrams and/or flowchart illustrations, and combinations of blocks in the block diagrams and/or flowchart illustrations, can be implemented by radio frequency, analog and/or digital hardware, and/or computer program instructions. These computer program instructions may be provided to a processor of a general purpose computer, special purpose computer, digital signal processor, and/or other programmable data processing apparatus, for example, in a mobile terminal or base station, such that the instructions, which execute via the processor of the computer and/or other programmable data processing apparatus, create a circuit and/or means for implementing the functions/acts specified in the block diagrams and/or flowchart block or blocks.

These computer program instructions may also be store(I in a computer-readable memory that can direct a mobile terminal to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks. It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Figure 1:
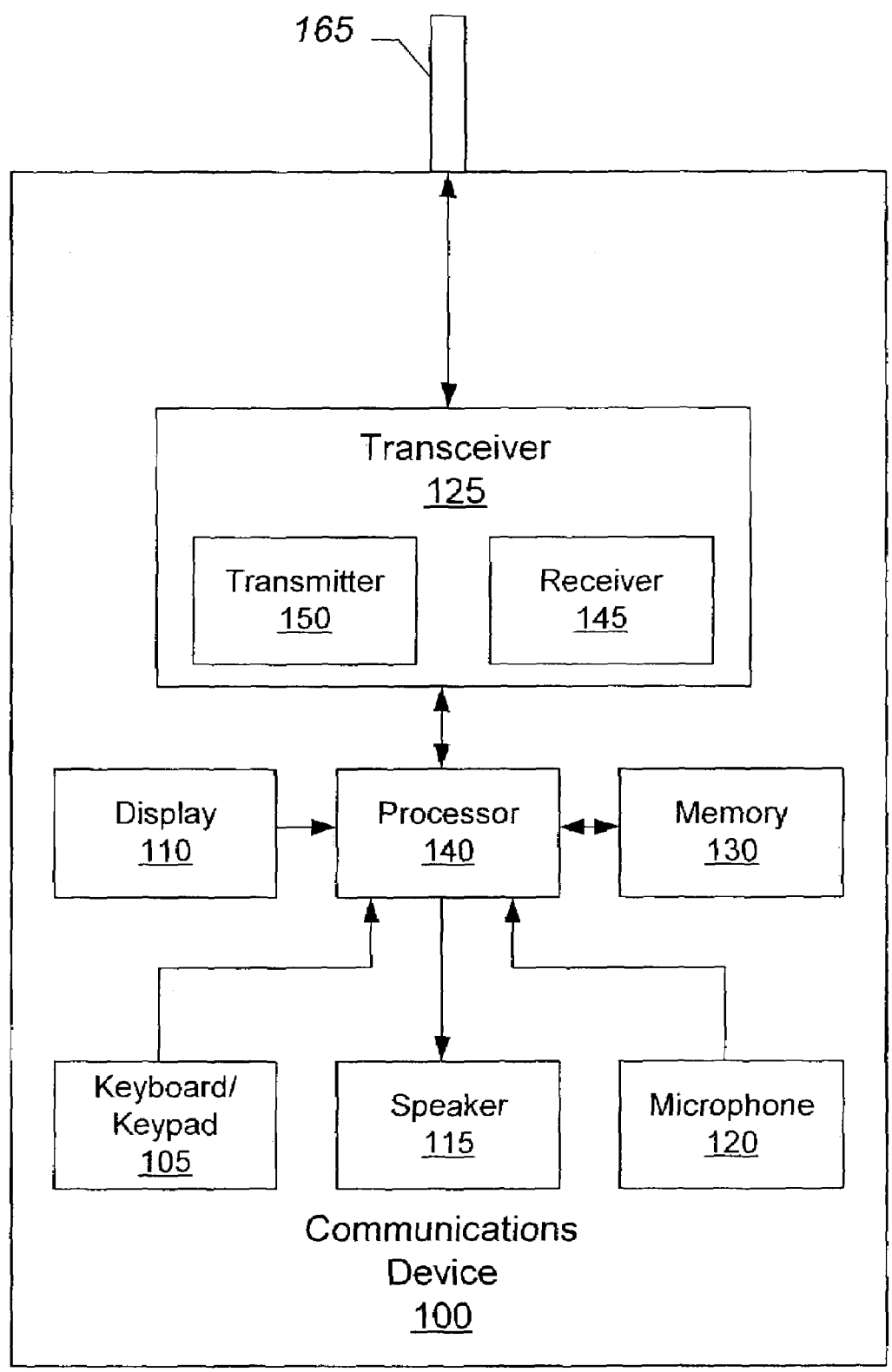
FIG. 1 is a block diagram of mobile terminals and/or base stations according to some embodiments of the present invention.

Embodiments of the present invention will now be further described with reference to the schematic block diagram illustration of a communications device 100 in FIG. 1, such as a mobile terminal and/or base station. FIG. 1 illustrates a device 100 that may comprise a network transceiver 125, and a memory 130 that communicates with a processor 140. As is also illustrated in FIG. 1, the communications device 100 may also include one or more of a keyboard/keypad 105, a display 110, a speaker 115 and/or a microphone 120.

The network transceiver 125 typically includes a transmitter circuit 150 and a receiver circuit 145, which respectively transmit outgoing radio frequency signals to/from a base station or wireless terminal and receive incoming radio frequency signals to/from the base station or wireless terminal via an antenna 165. While a single antenna 165 is shown in FIG. 1, it is to be understood that multiple antennas and/or different types of antennas may be utilized based on the types of signals being received. The radio frequency signals transmitted between the communications 100 and a base station/mobile terminal may comprise both traffic and control signals (e.g., paging signals/messages for incoming calls), which are used to establish and maintain communication with another party or destination, and may provide uplink and/or downlink communications. However, the present invention is not limited to such two-way communication systems.

The foregoing components of the communications device 100 may be included in many conventional mobile terminals and their functionality is generally known to those skilled in the art. It should be further understood, that, as used herein, the term "mobile terminal" may include, but is not limited to, a cellular radiotelephone with or without a multi-line display; a Personal Communications System (PCS) terminal that may combine a cellular radiotelephone with data processing, facsimile and data communications capabilities; a Personal Data Assistant (PDA) that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

Although the present invention may be embodied in communication devices or systems, such as the communications device 100, the present invention is not limited to such devices and/or systems. Instead, the present invention may be embodied in any method, transmitter, communication device, communication system, or computer program product that utilizes network initiated subsequent provisioning messages.

Figure 2:
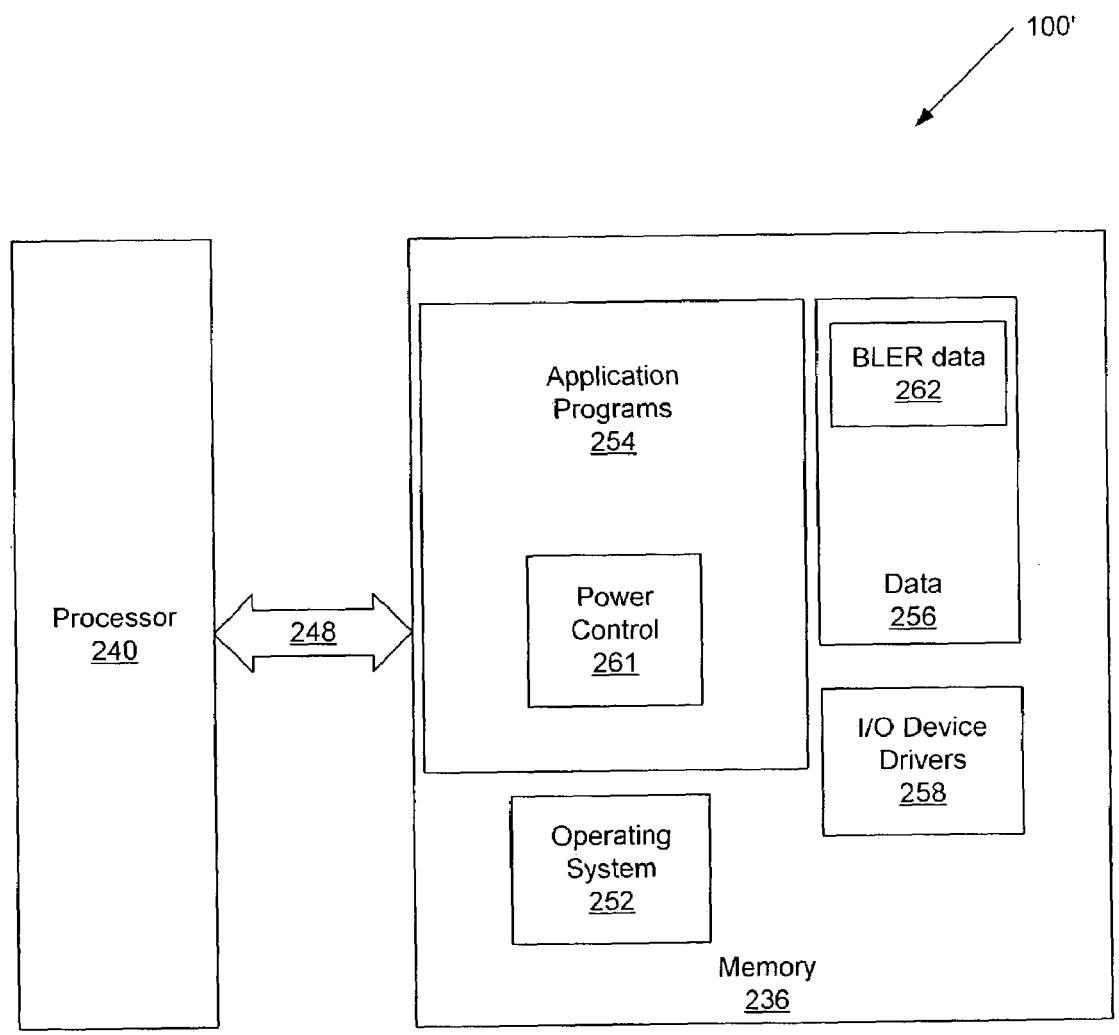
FIG. 2 is a more detailed block diagram of mobile terminals and/or base stations according to some embodiments of the present invention.

FIG. 2 is a block diagram of embodiments of a communications device 100' that illustrates systems, methods, and computer program products in accordance with embodiments of the present invention. The processor 240 communicates with the memory 236 via an address/data bus 248. The processor 240 can be any commercially available or custom microprocessor including, for example, a digital signal processor. The memory 236 is representative of the overall hierarchy of memory devices containing the software and data used to implement the functionality of the communications device 100'. The memory 236 can include one or more of, but is not limited to, the following types of devices: cache, ROM, PROM, EPROM, EEPROM, flash memory, SRAM, and DRAM.

As shown in FIG. 2, the memory 236 may include several categories of software and/or data used in the communications device 100': the operating system 252; the application programs 254; the input/output (I/O) device drivers 258; and the data 256. As will be appreciated by those of skill in the art, the operating system 252 may be any operating system suitable for use with a mobile terminal and/or base station, such as OS/2, AIX or System390 from International Business Machines Corporation, Armonk, N.Y., WindowsCE, Windows95, Windows98, Windows2000, WindowsNT or WindowsXP from Microsoft Corporation, Redmond, Wash., Unix, Linux, Palm OS, custom or proprietary operating systems. The operating systems may be configured to support an IP-based or other such network communication protocol connection. The I/O device drivers 258 typically include software routines accessed through the operating system 252 by the application programs 254 to communicate with devices such as transceiver 125 and certain memory 236 components. The application programs 254 are illustrative of the programs that implement the various features of the mobile terminal 100 and preferably include at least one application that supports operations according to embodiments of the present invention. Finally, the data 256 represents the static and dynamic data used by the application programs 254, the operating system 252, the I/O device drivers 258, and other software programs that may reside in the memory 236.

As is further seen in FIG. 2, the application programs 254 may include a power control module 261. The power control module 261 may carry out the operations described herein for determining if a different transmission power is to be requested by the communications device 100. The data portion 256 of the memory 236, as shown in the embodiments of FIG. 2, may include BLER data 262 that stores BLER information as described herein.

While the present invention is illustrated, for example, with reference to the power control module 261 being an application program in FIG. 2, as will be appreciated by those of skill in the art, other configurations may also be utilized while still benefiting from the teachings of the present invention. For example, the power control module 261 may also be incorporated into the operating system 252, the I/O device drivers 258 or other such logical division of the communications device 100. Thus, the present invention should not be construed as limited to the configuration of FIG. 2 but is intended to encompass any configuration capable of carrying out the operations described herein.

Figure 3:
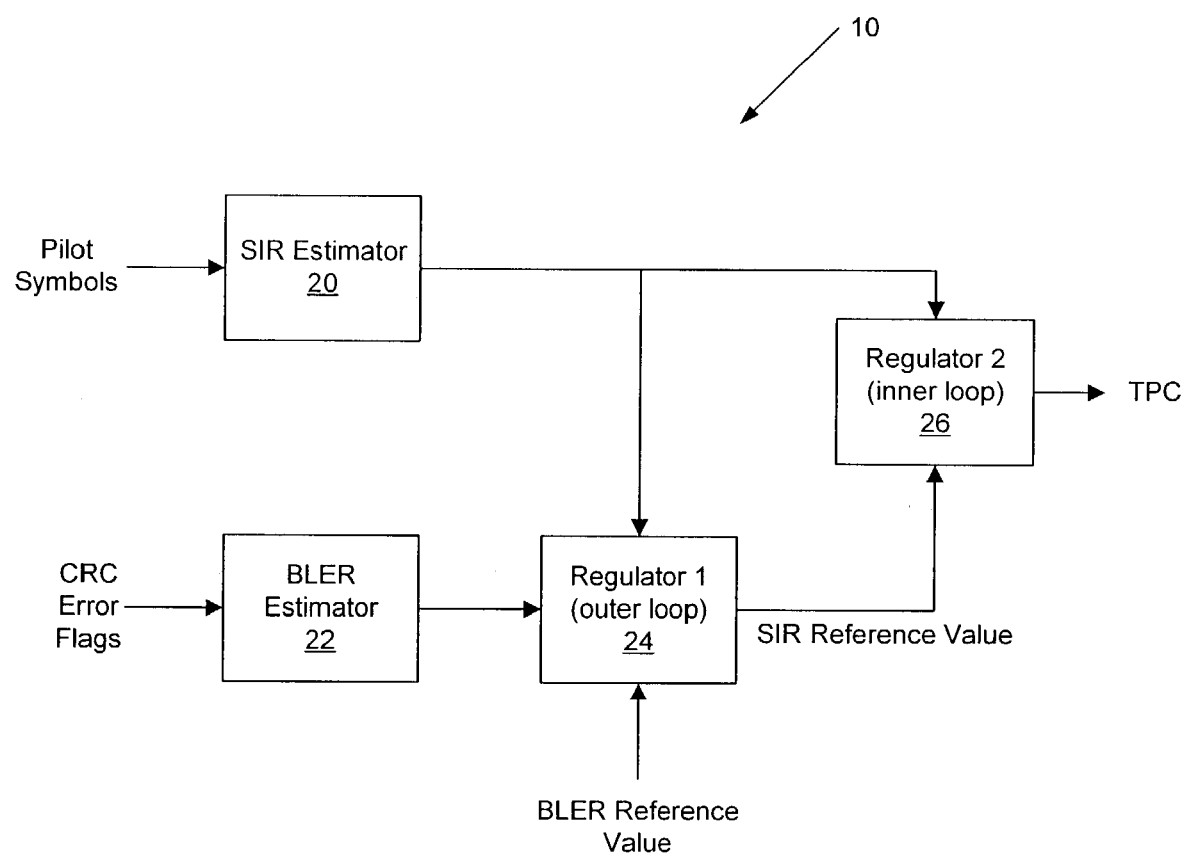
FIG. 3 is a block diagram of a power controller according to embodiments of the present invention.

FIG. 3 is a block diagram of a power control system 10, such as may, for example, be provided by the power control module 261, according to certain embodiments of the present invention. As seen in FIG. 3, the power control system 10 receives as inputs pilot symbols from which an estimate of the SIR of the received signal is determined by the SIR estimator 20. The SIR estimation from pilot symbols is known to those of skill in the art and the SIR estimator 20 may be a conventional SIR estimator such as those utilized in conventional power control systems. Thus, the SIR estimator 20 will not be described in further detail herein.

The power control system 10 also receives as an input CRC error flags (CRCef) that are provided to a block error rate (BLER) estimator 22. The BLER estimator 22 may carry out operations as described herein for estimating the block error rate of the communications channel based on CRC error flags. The BLER is provided to an outer loop control regulator, regulator 1 24, which also receives a BLER reference value. The regulator 1 24 determines an SIR reference value based on the BLER from the BLER estimator 22, the measured SIR value and the BLER reference value and provides the SIR reference value to an inner loop control regulator, regulator 2 26. In certain embodiments of the present invention, the SIR reference value may be generated by the regulator 1 24 based on a filtered block error rate. The regulator 2 26 generates a transmission power control (TPC) signal based on the relationship between the measured SIR value provided by the SIR estimator 20 and the SIR reference value provided by the regulator 1 24. Operations of the inner loop control regulator to generate the TPC signal based on the measured SIR value and the reference SIR value may be carried out in a conventional manner and, therefore, will not be described further herein.

Operations of the power control system 10 will now be described in more detail for a transport channel having a TTI that contains B transport blocks. CRC error flags for the transport channel may be denoted as $CRCef_b$ for b from zero to B-1. The last slot of the $n^{th}$ TTI may be designated k_n. The SIR reference value may be designated $SIR_{ref}$ and the filtered measured SIR value in the last slot of the $n^{th}$ TTI may be designated $SIR_{filt,k\_n}$. The filtered block error rate at the end of the $n^{th}$ TTI may be designated $BLER_n$ and the reference block error rate may be designated $BLER_{ref}$. In such a case, $BLER_n$ may be determined by iterating the following equation:

$$\beta_{b+1} = (1-\lambda)\beta_b + \lambda CRCef_{b+1}$$

This equation is iterated B times with $\beta_0$ being the filtered block error rate of the previous TTI, $BLER_{n-1}$. The filtered block error rate of the $n^{th}$ TTI, $BLER_n$, then is given by $\beta_B$ for the constant $\lambda$, that may depend on the reference block error rate $BLER_{ref}$. For example, in certain embodiments of the present invention, $\lambda$ may range from about $BLER_{ref}/40$ to about $BLER_{ref}/5$. In particular embodiments of the present invention, $\lambda$ is $BLER_{ref}/20$.

Furthermore, in certain embodiments of the present invention, the reference SIR value is updated to provide an updated reference SIR value ($SIR_{ref,n}$) based on a current reference SIR value ($SIR_{ref,n-1}$)) by determining the following:

$$SIR_{ref,n} = Ke_n + SIR_{ref,n-1},$$

where $e_n = BLER_n - BLER_{ref}$ and the initial block error rate ($BLER_0$) is set to $BLER_{ref}$. The value of K is the controlling constant, as described, for example, in Åström et al., "Computer-Controlled Systems, Theory and Design," $2^{nd}$ edition, Prentice Hall, 1984. In particular embodiments of the present invention, K may be from about ⅛ to about 2 and in certain embodiments K is 0.5.

In some embodiments of the present invention, an anti-windup procedure for updating the reference SIR value ($SIR_{ref}$) is provided by selectively updating $SIR_{ref}$ based on the relationship of the measured SIR to the reference SIR. In particular embodiments, the measured SIR is a filtered SIR value for the last slot of the $n^{th}$ TTI. This value may be compared to a predefined range of values associated with the reference SIR value and the reference SIR value is updated if the measured SIR value is within the predefined range or if the update to the reference SIR value would move the reference SIR value closer to the measured SIR value.

For example, in the above described system, the values for $e_n$, $SIR_{filt,k\_n}$, $BLER_n$ may be determined as described above. It may then be determined if $c_1 SIR_{filt,k\_n}$ is greater than the current reference SIR value ($SIR_{ref,n-1}$) and if $c_1 SIR_{ref,n}$ is greater than $SIR_{filt,k\_n}$. If both conditions are met, then the filtered measured SIR value is within 10 log $c_1$ dB of the reference value and the reference SIR value is updated, either with a value based on the current reference SIR value, the measured block error rate and the reference block error rate or, in certain embodiments, a value based on the current reference SIR value as described below with regard to the emergency procedure. In the present example, $c_1$ may be 2. Furthermore, the filtered measured SIR value may be utilized rather than the instantaneous measured SIR value because the instantaneous value may be associated with a high level of noise.

Additionally, it may be determined if $c_1 SIR_{filt,k\_n}$ is less than or equal to the current reference SIR value ($SIR_{ref,n-1}$) and if $e_n$ is less than zero. If so, then the filtered measured SIR value is 10 log $c_1$ dB or greater away from (less than) the current reference SIR value and the change in the reference SIR value resulting from $e_n$ (i.e. the measured block error rate is less than the reference block error rate) moves the reference SIR value closer to being within 10 log $c_1$ dB of the filtered measured SIR value. If so, then reference SIR value is updated as described above.

It may also be determined if $SIR_{filt,k\_n}$ is greater than or equal to $c_1 SIR_{ref,n-1}$ and if $e_n$ is greater than zero. If so, then the filtered measured SIR value is 10 log $c_1$ dB or more away from (greater than) the current reference SIR value and the change in the reference SIR value resulting from $e_n$ (i.e. the measured block error rate is greater than the reference block error rate) moves the reference SIR value closer to being within 10 log $c_1$ dB of the filtered measured SIR value. If so, then the reference SIR value is updated as described above.

In additional embodiments of the present invention, an anti-windup procedure for the measured block error rate is provided. Such a block error rate anti-windup procedure may be utilized alone or in combination with the reference SIR anti-windup procedure. The block error rate anti-windup procedure selectively sets the block error rate utilized in updating the reference SIR value based on whether the SIR anti-windup has been used for the preceding TTI. If so, the current block error rate utilized to determine the reference SIR value may be adjusted to prevent unbounded increases in the reference SIR value. For example, the current block error rate may be limited to the lesser of a weighted reference block error rate, a weighted current block error rate and a weighted previously stored block error rate.

For example, if the conditions described above with respect to the anti-windup procedure for the reference SIR value are not met for an attempt at updating the reference SIR value, then $BLER_n$ may be set to:

$$\min(c_2^{(1)} BLER_{freeze}, c_2^{(2)} BLER_{n-1}, c_2^{(3)} BLER_{ref}),$$

where $c_2^{(1)}$, $c_2^{(2)}$ and $c_2^{(3)}$ are constants associated with the respective BLER values and where $BLER_{freeze}$ is the BLER value from the previous attempt to update the reference SIR value. For example, the constant values may be set to $c_2^{(1)} = 2$, $c_2^{(2)} = 1$, and $c_2^{(3)} = 2$. Thus, the BLER value is limited to no more than twice $BLER_{ref}$.

In still further embodiments of the present invention, an emergency procedure is provided if more than a specified number of consecutive transport blocks have a number of CRC errors that is greater than a predefined threshold. In such a case, the reference SIR value may be set to a value based on the current SIR reference value without reference to the block error rate so as to take into account severe error conditions in the communications channel.

For example, the quality of the propagation channel may be checked by determining if the number of transport blocks having CRC errors is greater than a threshold value for a series of successive TTI's. Thus, for example, the CRC error flags in a TTI may be counted to determine if at least $c_3 B$ error flags were set, where $c_3$ is a value from 0 to 1. For example, $c_3$ may be 0.5. If the threshold number of error flags are set for a TTI, the number of consecutive TTI's with the threshold level of error flags may be counted and, if a sufficiently high number ($c_4$) is reached, the emergency procedures may be carried out. The threshold value $c_4$ may be fixed or variable. For example, the value of $c_4$ could vary depending on the reference BLER value. Thus, for example, values of $c_4$ may be provided as $c_4 = 4$ for a $BLER_{ref} = 0.1$, $c_4 = 3$ for $BLER_{ref} = 0.01$ and $c_4 = 2$ for $BLER_{ref} = 0.001$. As described above, if the emergency criteria are met, the reference SIR value may be set to $c_5 SIR_{ref,n-1}$, where $c_5$ may be equal to 2 or other such value that may, for example, be empirically determined. Furthermore, the value of $BLER_n$ may also be adjusted. For example, $BLER_n$ may be set as $BLER_n = \min(c_2^{(4)}BLER_n, c_2^{(5)}BLER_{ref})$, where $c_2^{(4)}$ and $c^{2(5)}$ are constants, such as $c_2^{(4)} = c_2^{(5)} = 1$.

Figure 4:
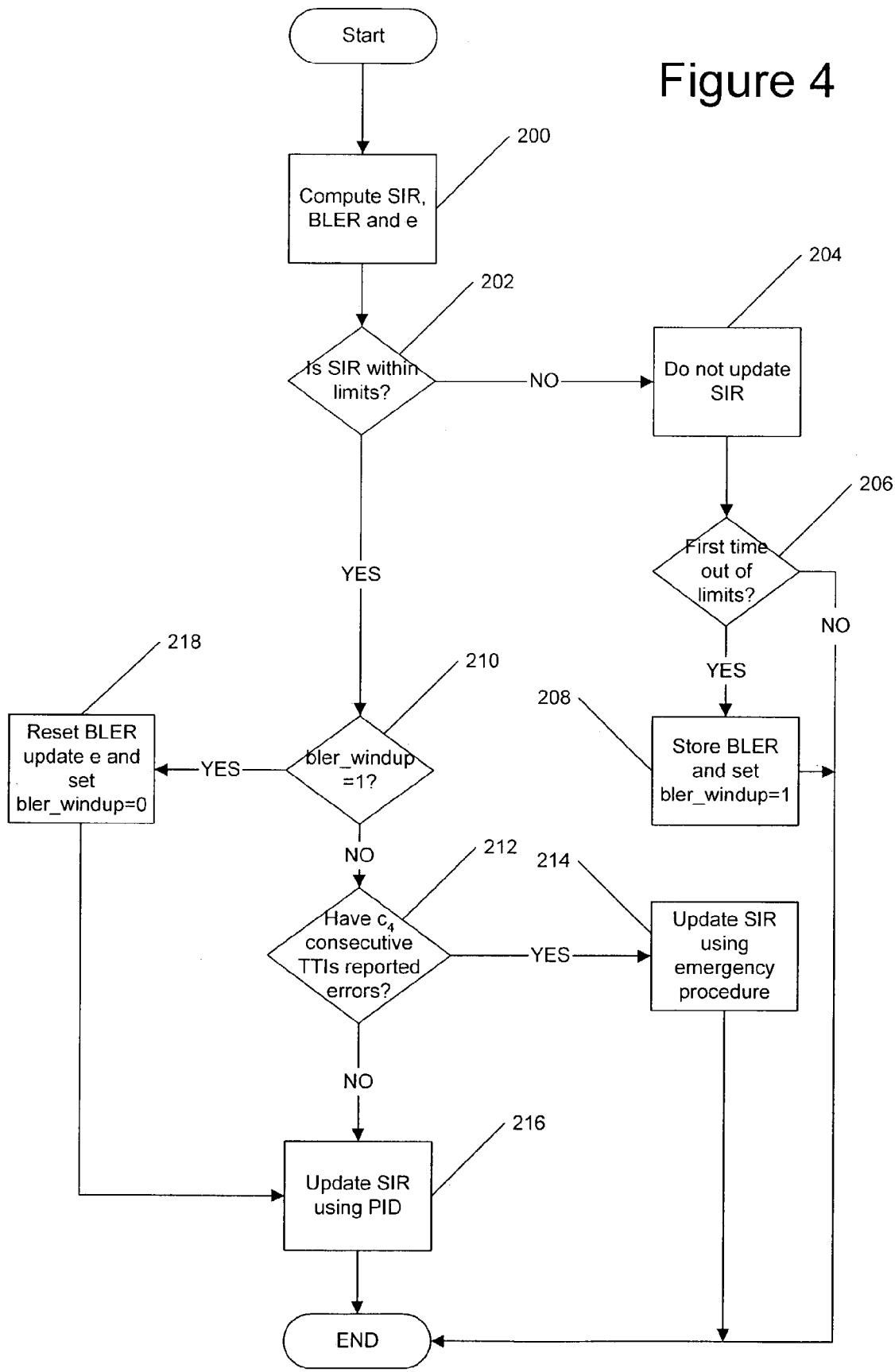
FIG. 4 is a flowchart illustrating operations according to embodiments of the present invention.

Particular embodiments of the present invention will now be described with reference to the flowchart illustration of FIG. 4 which is a flowchart of operations incorporating reference SIR anti-windup, BLER anti-windup and emergency procedures according to embodiments of the present invention. As seen in FIG. 4, a filtered measured SIR value $SIR_{filt,k\_n}$, a $BLER_n$ value and an $e_n$ value are determined (block 200). These values may be determined as described above. The filtered measured SIR value and/or the $e_n$ value are evaluated to determine if the filtered measured SIR value is within a predefined range of the reference SIR value and/or if the filtered measured SIR value is outside the range but that the change in the reference SIR value would result in the filtered measured SIR value being closer to the range (block 202). Such a determination may be made as described above. If the conditions for the filtered measured SIR value and/or the $e_n$ value are not met (block 202), the reference SIR value is not updated (block 204).

If the reference SIR value is not updated (block 204), a determination is made if it is the first time that the reference SIR value has not been updated since a successful update (block 206). Such a determination may be made, for example, by determining if a flag has been previously set indicating that a reference SIR value was not updated. If it is not the first time (block 206), then further operations for the current update are bypassed. If it is the first time the reference SIR has not been updated (block 206), the current BLER value is stored, for example, as $BLER_{freeze}$, and a flag (bler_windup) is set indicating that the reference SIR value was not updated and the BLER anti-windup procedure is to be used (block 208). After storing the BLER value and setting the flag, further operations for the current update are bypassed.

If the conditions for the filtered measured SIR value and/or the $e_n$ value are met (block 202), the BLER anti-windup flag (bler_windup) is evaluated to determine if it is set (block 210). If not, a determination is made if a predefined number of consecutive TTIs ($c_4$) have reported more than a threshold value ($c_3B$) of CRC errors (block 212). If so, the emergency procedure is utilized to update the reference SIR value (block 214). For example, the reference SIR value may be set to a value proportional to the current reference SIR value as described above. The relationship between the updated reference SIR value and the current reference SIR value may be fixed or variable.

If a predefined number of consecutive TTIs ($c_4$) have not reported more than a threshold value ($c_3B$) of CRC errors (block 212), the reference SIR value is updated utilizing, for example, the PID determination or other suitable regulator. Thus, for example, the reference SIR value may be updated by determining $SIR_{ref,n} = Ke_n + SIR_{ref,n-1}$.

Returning to block 210, if the BLER anti-windup flag (bler_windup) is set (block 210), the BLER anti-windup procedure is carried out by the BLER value being reset to limit the range of the BLER value and the BLER anti-windup flag is reset (block 218). The reference SIR value is updated using the reset BLER value utilizing the PID determination (block 216). Thus, for example, a new $e_n$ value may be generated utilizing the reset BLER value and the the reference SIR value may be updated by determining $SIR_{ref,n} = Ke_n + SIR_{ref,n-1}$. Furthermore, the BLER value may, for example, be reset to limit the range of the BLER value by determining $\min(c_2^{(1)}BLER_{freeze}, c_2^{(2)}BLER_{n-1}, c_2^{(3)}BLER_{ref})$ as described above.

Pseudo-code for certain embodiments of the present invention incorporating both anti-windup procedures and the emergency procedure is provided below. Such operations may, for example, be carried out by an outer loop control regulator of a two loop power control circuit, such as regulator 1 24 of FIG. 1. As initial values, values for $e_n$, $SIR_{filt,k\_n}$, $BLER_n$ are determined prior to the beginning of the pseudo-code. The value of bler_windup should be initialized to zero.

```
if (c₁SIR_filt,k_n > SIR_ref,n−1 and SIR_filt,k_n < c₁SIR_ref,n−1)

or (c₁SIR_filt,k_n ≤ SIR_ref,n−1 and e_n < 0)

or (SIR_filt,k_n ≤ SIR_ref,n−1 and e_n < 0)

{
              B−1
        if    ∑   CRFef_b ≥ c₃B
              b=0

{
            nbr_CRCef += 1
        }
    else
        {
            nbr_CRCef = 0
        }
    if bler_windup = 1
        {

BLER_n = min(c₂⁽¹⁾BLER_freeze, c₂⁽²⁾BLER_n−1, c₂⁽³⁾BLER_ref)
            e_n = BLER_n − BLER_ref
            SIR_ref,n = Ke_n + SIR_ref,n−1

}
    else
        {
        if nbr_CRCef = c₄
            {
                SIR_ref,n = c₅SIR_ref,n−1
                nbr_CRCef = 0
                BLER_n = min(c₂⁽⁴⁾BLER_n, c₂⁽⁵⁾BLER_ref)
            }
        else
            {
            e_n=BLER_n-BLER_ref
            SIR_ref.n = Ke_n + SIR_ref,n−1
            }
        }
}
else
{
    SIR_ref,n = SIR_ref,n−1
    nbr_CRCef = 0
    if bler_windup = 0
        {
            BLER_freeze = BLER_n
            bler_windup = 1
        }
}
```

In this pseudo-code, the outer "if" statement provides the SIR anti-windup and the initial test for the BLER anti-windup. The "else" portion of the outer "if" statement sets $SIR_{ref,n}$ to $SIR_{ref,n-1}$ so as to prevent the update if the conditions are not met and also sets the flag bler_windup to indicate that an attempt at updating the reference SIR value failed to update the reference SIR value.

The first inner "if" statement determines the count of TTI's that have had blocks with CRC errors over a predefined threshold for the emergency procedure. The second inner "if" statement tests to determine the BLER anti-windup flag is set and if so, the BLER value is updated. If not, then the emergency procedure threshold $c_4$ is tested by the next "if" statement to determine if the emergency threshold has been met and, if so, the emergency procedure is carried out. If not, the reference SIR is updated using the PID control value.

Embodiments of the present invention have been described with reference to measured values, such as SIR and BLER. However, such a term is used in a general sense and includes values that are estimated based on received signals and/or transport blocks and values that are directly or indirectly measured. Furthermore, the term measured is also intended to include values that have been further processed, for example, by filtering or other processing.

While the present invention has been described with reference to the communications channel being a wireless communications media, embodiments of the present invention may also be utilized in wired communications media where changes in transmission power may be requested by a receiving device. Furthermore, while embodiments of the present invention have been described with reference to a particular equations for determining an updated reference SIR value, the present invention should not be construed as limited to such equations but is intended to cover any technique for calculating an updated reference SIR value from a previous reference SIR value utilizing error rates of the decoded received signal.

While embodiments of the present invention have been described with reference to a single transport channel, as will be understood by those of skill in the art in light of the present disclosure, embodiments of the present invention may also include multiple transport channels. In such embodiments, a reference SIR value may be associated with each transport channel. A final reference SIR value could be determined based on the multiple reference SIR values, for example, by selecting a maximum value, by a linear combination of the reference SIR values or by other combinations of reference SIR values.

Furthermore, while embodiments of the present invention have been described with reference to SIR values, the teachings of the present invention could also be used with other quality measures.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of determining a reference signal to interference ratio (SIR) value for use in requesting changes in a transmitted power level of a received signal of a communications channel, comprising:
   comparing a measured SIR value to a predefined range of values associated with a current reference SIR value; and
   updating the reference SIR value utilizing a proportional integral derivative determination based on a current estimated block error rate and a reference block error rate if the measured SIR value is within the predefined range.

2. The method of claim 1, further comprising updating the reference SIR value based on the current estimated block error rate and the reference block error rate if the measured SIR value is outside the predefined range and the update of the reference SIR value moves the reference SIR value closer to the measured SIR value.

3. The method of claim 1, further comprising:
   determining if the reference SIR value was not updated in an immediately prior evaluation to determine if the reference SIR value is to be updated; and
   updating the current estimated block error rate if it is determined that the reference SIR value was not updated in an immediately prior evaluation to determine if the reference SIR value is to be updated.

4. The method of claim 3, wherein updating the current estimated block error rate comprises bounding the current estimated block error rate with respect to at least one of a reference block error rate and/or a previous estimated block error rate.

5. The method of claim 4, further comprising:
   storing the current estimated block error rate if the reference SIR value is not updated.

6. The method of claim 5, wherein storing the current estimated block error rate comprises storing the current estimated block error rate if an immediately prior evaluation to determine if the reference SIR value is to be updated results in updating the reference SIR value and a current evaluation to determine if the reference SIR value is to be updated does not result in updating the reference SIR value.

7. The method of claim 5, wherein updating the current estimated block error rate comprises setting the current estimated block error rate to a lowest value of a value based on a reference block error rate, a value based on the stored estimated block error rate and a value based on the current estimated block error rate.

8. The method of claim 1, wherein the measured SIR value comprises a plurality of measured SIR values for different transport channels, the method further comprising updating the reference SIR value based on the plurality of measured SIR values.

9. A method of determining a reference signal to interference ratio (SIR) value for use in requesting changes in a transmitted power level of a received signal of a communications channel, the method comprising:
   comparing a measured SIR value to a predefined range of values associated with a current reference SIR value. and
   updating the reference SIR value based on a current estimated block error rate and a reference block error rate if the measured SIR value is within the predefined range; and
   determining if a plurality of successive transmit time intervals (TTIs) have greater than a threshold value of transport blocks having error conditions,
   wherein determining the reference SIR value comprises determining the reference value utilizing a proportional integral derivative (PID) determination if it is not determined that a plurality of successive TTIs have greater than a threshold value of transport blocks having error conditions, determining the reference value without utilizing the PID determination if it is determined that a plurality of successive TTIs have greater than a threshold value of transport blocks having error conditions, and setting the reference SIR value to a value independent of the estimated block error rate if it is determined that a plurality of successive TTIs have greater than a threshold value of transport blocks having error conditions.

10. The method of claim 9, wherein setting the reference SIR value comprises setting the reference SIR value by scaling the current SIR reference value with a constant value if it is determined that a plurality of successive TTIs have greater than a threshold value of transport blocks having error conditions.

11. A power control circuit of a communications device comprising:
   an inner control loop configured to request changes in transmitted power based on a measured signal to interference ratio (SIR) value and a reference SIR value; and
   an outer control loop configured to provide the reference SIR value to the inner control loop, the outer control loop comprising:
   a control regulator configured to compare the measured SIR value to a predefined range of values associated with a current reference SIR value and selectively update the reference SIR value provided to the inner control loop based on an estimated block error rate (BLER), a reference BLER and the comparison of the measured SIR value to the predefined range, to update the reference SIR value utilizing a proportional integral derivative determination if the measured SIR value is within the predefined range, and to update the reference SIR value utilizing a proportional integral derivative determination if the measured SIR value is outside the predefined range and the update of the reference SIR value moves the reference SIR value closer to the measured SIR value.

12. The power control circuit of claim 11, wherein the control regulator is further configured to determine if the reference SIR value was not updated in an immediately prior evaluation to determine if the reference SIR value is to be updated and update the current estimated block error rate if it is determined that the reference SIR value was not updated as a result of the immediately prior evaluation.

13. The power control circuit of claim 12, wherein the control regulator is configured to update the current estimated block error rate by bounding the current estimated block error rate with respect to at least one of a reference block error rate and/or a previous estimated block error rate.

14. The power control circuit of claim 12, wherein the control regulator is further configured to store the current estimated block error rate if an evaluation to determine if the reference SIR value is to be updated does not result an update of the reference SIR value.

15. The power control circuit of claim 14, wherein the control regulator is further configured to store the current estimated block error rate if an immediately prior evaluation to determine if the reference SIR value is to be updated results in updating the reference SIR value and a current evaluation to determine if the reference SIR value is to be updated does not result in updating the reference SIR value.

16. The power control circuit of claim 14, wherein the control regulator is further configured to set the current estimated block error rate to a lowest value of a value based on a reference block error rate, a value based on the stored estimated block error rate and a value based on the current estimated block error rate.

17. The power control circuit of claim 11, wherein the communications device comprises a mobile terminal.

18. The power control circuit of claim 11, wherein the communications device comprises a wireless base station.

19. A power control circuit of a communications device, comprising:
   an inner control loop configured to request changes in transmitted power based on a measured signal to interference ratio (SIR) value and a reference SIR value; and
   an outer control loop configured to provide the reference SIR value to the inner control loop, the outer control loop comprising:
   a control regulator configured to selectively update the reference SIR value provided to the inner control loop based on an estimated block error rate (BLER), a reference BLER and the measured SIR value, to determine if a plurality of successive transmit time intervals (TTIs) have greater than a threshold value of transport blocks having error conditions, and to set the reference SIR value to a value independent of the estimated block error rate if it is determined that a plurality of successive TTIs have greater than a threshold value of transport blocks having error conditions,
   wherein the control regulator is further configured to determine the reference value utilizing a proportional integral derivative (PID) determination if it is not determined that a plurality of successive TTIs have greater than a threshold value of transport blocks having error conditions, and to determine the reference value without utilizing the PID determination if it is determined that a plurality of successive TTIs have greater than a threshold value of transport blocks having error conditions.

20. The power control circuit of claim 19, wherein the control regulator is further configured set the reference SIR value by scaling the current SIR reference value with a constant value if it is determined that a plurality of successive TTIs have greater than a threshold value of transport blocks having error conditions.

21. A method of determining a reference signal to interference ratio (SIR) value for use in requesting changes in a transmitted power level of a received signal of a communications channel, comprising:
   determining if a plurality of successive transmit time intervals (TTIs) have greater than a threshold value of transport blocks having error conditions; and
   setting the reference SIR value to a value independent of an estimated block error rate if it is determined that a plurality of successive TTIs have greater than a threshold value of transport blocks having error conditions,
   wherein determining the reference SIR value further comprises determining the reference SIR value utilizing a proportional integral derivative (PID) determination if it is not determined that a plurality of successive TTIs have greater than the threshold value of transport blocks having error conditions, and determining the reference SIR value without utilizing the PID determination if it is determined that a plurality of successive TTIs have greater than the threshold value of transport blocks having error conditions.

22. The method of claim 21, wherein setting the reference quality measurement value comprises setting the reference quality measurement value by scaling a current reference quality measurement value with a constant value if it is determined that a plurality of successive TTIs have greater than a threshold value of transport blocks having error conditions.

* * * * *